United States Patent [19]

Stengle, Jr.

[11] 4,110,095
[45] Aug. 29, 1978

[54] MANUFACTURE OF GLASS WHEREIN HOT METAL MOLDS ARE PROVIDED WITH A SOLID FILM LUBRICANT LAYER

[75] Inventor: Edward J. Stengle, Jr., Toledo, Ohio

[73] Assignee: Owens-Illinois, Inc., Toledo, Ohio

[21] Appl. No.: 727,322

[22] Filed: Sep. 27, 1976

Related U.S. Application Data

[63] Continuation of Ser. No. 562,554, Mar. 27, 1975, abandoned.

[51] Int. Cl.$^2$ .............................................. C03C 39/00
[52] U.S. Cl. .......................................... 65/26; 65/169; 252/12; 252/29
[58] Field of Search ............... 65/28, 26, 169; 252/12, 252/12.2, 29

[56] References Cited

U.S. PATENT DOCUMENTS

| | | | |
|---|---|---|---|
| 2,498,485 | 2/1950 | Clawson | 427/239 |
| 3,874,862 | 4/1975 | Bickling, Jr. et al. | 65/26 |

Primary Examiner—Arthur D. Kellogg
Attorney, Agent, or Firm—Howard G. Bruss, Jr.; M. E. Click; D. H. Wilson

[57] ABSTRACT

An improvement is provided in methods for forming glass articles which methods are of the type wherein hot formable glass is first formed into a parison, or blank, in a parison or a blank mold and then the parison, or blank, is formed into the final glass article in a blow mold and wherein there is no relative rotation of the glass and the respective molds in the forming operation; the improvement resides in providing the cavity-defining surface of the blank mold with a layer, or coating, of a solid film lubricant or glass release agent which essentially comprises a non-colloidal lubricating graphite dispersed in a thermoset, cured, hard organopolysiloxane binder. The layer, or coating, is formed by applying a dispersion of graphite in an organic solvent solution of a further-curable, thermosettable, solvent soluble, organopolysiloxane onto the cavity defining surface of the blank mold and then curing said organopolysiloxane to a thermoset hard condition. In another embodiment of this invention, the blank mold and the blow mold will both carry such a layer, or coating, but the blow mold will have a layer in which the graphite particle size is no larger than the size of the graphite employed in the blank mold layer and, preferably, will be smaller than the size of the graphite employed in the blank mold layer.

15 Claims, 1 Drawing Figure

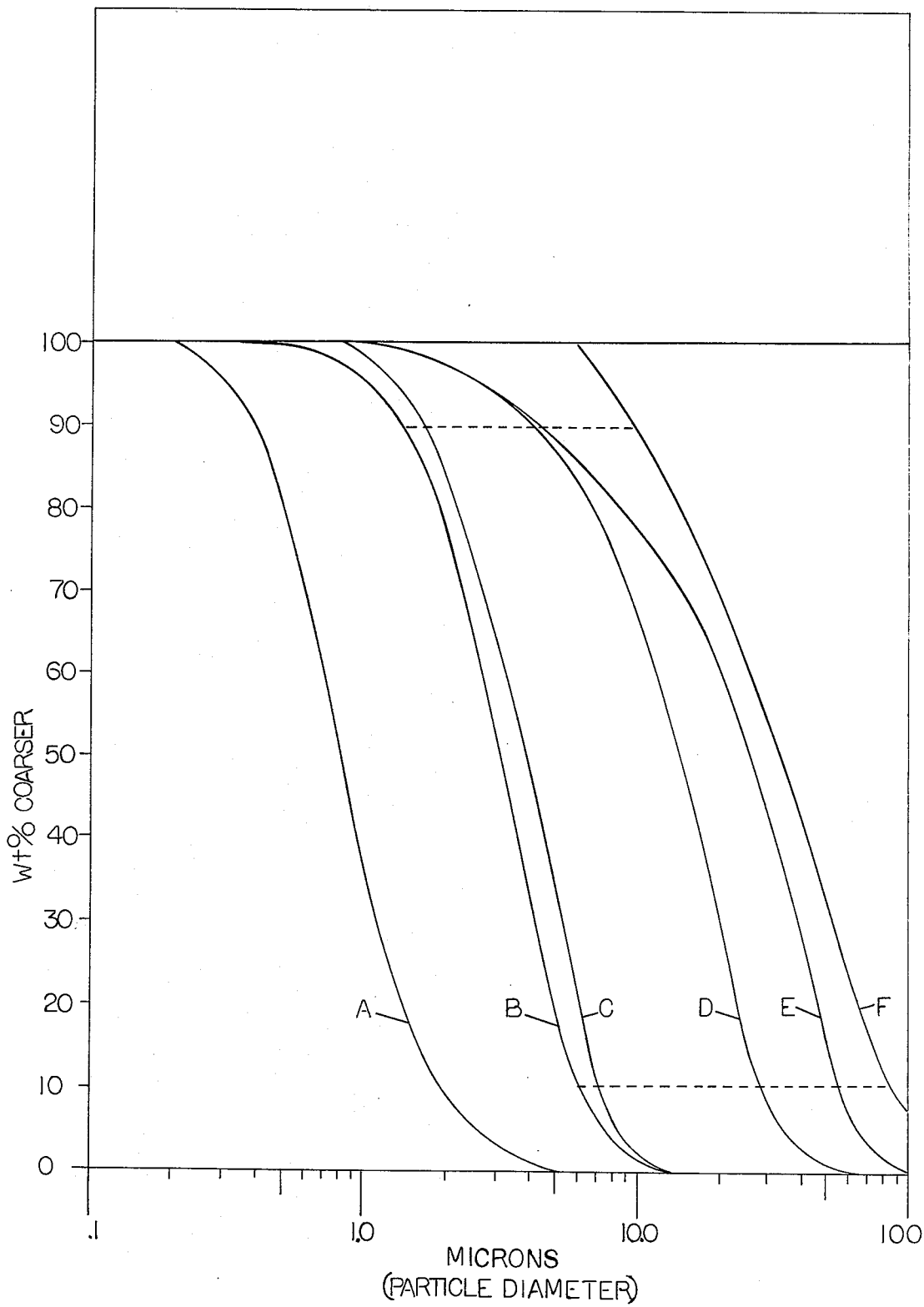

MANUFACTURE OF GLASS WHEREIN HOT METAL MOLDS ARE PROVIDED WITH A SOLID FILM LUBRICANT LAYER

This is a continuation, of application Ser. No. 562,554, now abandoned filed Mar. 27, 1975.

BACKGROUND OF THE INVENTION

The present invention is directed to the art of glass manufacturing and more particularly is directed to an improvement in the art of glass manufacturing wherein hot iron or hot metal molds are utilized.

Glass articles are manufactured in the glass industry by one of two non-analogous techniques. That is, the formation can be brought about by the utilization of paste mold technology or it may be formed by the non-analogous method of employing hot iron or hot metal mold technology, the latter hereinafter being referred to as hot metal mold technology. With regard to this distinction between paste mold technology and hot metal mold technology, and also for a description of the techniques for forming glass articles reference may be had to *Glass Engineering Handbook* by E. B. Shand, McGraw Hill Book Company, 1958, and the *Handbook of Glass Manufacture*, Volume 1, Ogden Publishing Company, 1953. Paste mold technology involves a rotational speed differential between the paste mold and the glass, that is, there is relative rotation of the paste mold and the glass with the paste mold being run in a wet condition by the use of water. The paste itself is generally some form of adherent carbon which is porous and thereby capable of absorbing the water. It is generally indicated that, with regard to the paste mold operation, the glass is formed against a boundry layer of steam which functions as a cushion. One of the characteristics of the glassware produced by using paste mold technology is that because of the relative rotation of the paste mold and the glass, the final glass articles have no mold seam. U.S. Pat. No. 2,573,337 discloses the use of a cured organopolysiloxane for use on a paste mold when forming, for example, glass bulbs on a bulb or ribbon machine.

In the non-analogous technique of forming glassware by the use of hot metal molds, molten formable glass is first formed into a parison, or blank, by being brought into contact with a glass-contacting, or glass-forming, cavity-defining surface of a parison, or blank, mold and this parison, or blank, is then subsequently formed into the final article in a blow mold by contact with a glass-forming, or glass-contacting, cavity-defining surface thereof. The formation of the parison, or blank, and the formation of the final article from the parison or blank is accomplished without relative rotation of the glass and the respective molds. Typical of the glass forming apparatus, which operate with hot metal molds are the conventional I.S. glass forming machines, which may operate either on a blow and blow type of operation or a press and blow type of operation, and the Owens glass forming machine. Inasmuch as the use of hot metal mold forming does not employ a steam cushion, it is generally considered that in such forming techniques the glass is in contact with the glass-forming, cavity-defining surface of the mold. Those skilled in the art know the importance of the characteristics, e.g. the cavity-defining surface characteristics, of a hot metal mold to the proper operation of forming process. The interior surface, that is, the glass-contacting or glass-forming, cavity-defining surface thereof, must possess characteristics, including proper heat transfer and proper release of the glass, so as to avoid undesirable quality defects. The hot metal molds must also run hot enough to avoid sudden cooling of the glass which would otherwise result in the formation of checks. Balanced against this, it will be appreciated that the hot metal molds must not run too hot because the glass will tend to stick to the cavity-defining surface of the mold and produce a final article having a quality defect characteristic of such sticking. In an attempt to help the overall operation, of forming glass using hot metal molds, it is commercial practice to dope, or swab, these molds to assist glass release with such materials as oil, graphite, greases, sulphur, rubber, old shoe heel and the like. This type of swabbing, or doping, has its readily apparent deficiencies and limitations. For example, such doping or swabbing is generally done based on the subjective evaluation of independent glass machine operators and therefore, is not conductive to reliability. Another deficiency of this technique is that, typically, these materials are carried in volatile organic carriers which carriers, upon contact with the hot metal mold, flash off and contaminate the general forming area with pollutants.

Czechoslovakian Pat. No. 128,236 entitled "Lubricants for Glass Molds", and the corresponding abstract thereof appearing in Chemical Abstracts, Volume 70, 1969, page 195, Abstract No. 108868Y, disclose a glass mold lubricant formed from an organopolysiloxane and colloidal graphite. Attention is also invited to Chemical Abstracts, Volume 60, Abstract No. 763D, entitled "Coatings Which Prevent Sticking of Molten Glass to a Mold" which discloses colloidal graphite and a silicone. Colloidal graphite is a permanent suspension of finely ground natural, or manufactured graphite, dispersed in a liquid carrier and is usually marketed as a dispersion or suspension concentrate of about 10 to 20% by weight graphite. The particle size of this colloidal graphite is on the order of 1 micron and finer and hence it will be appreciated that this is an extremely small, high surface area material. As will be seen in the examples which follow, the use of colloidal graphite is not satisfactory inasmuch as the wear rates obtained using such a material are not compatible with the need in the glass industry, in employing hot metal mold technology, for a high speed, high quality, low cost glass forming operation. With regard to a description of colloidal graphite, reference may be had to Kirk-Othmer, Encyclopedia of Chemical Technology, Volume 4, 1964, at page 325.

In U.S. Pat. No. 3,347,650, some of the deficiencies of swabbing molds are pointed out. This patent then provides for a solid film lubricant on a mold which, for example, is formed of lead monoxide powder in admixture with graphite. The undesirability of such an approach because of the toxicity of lead will be readily apparent to those skilled in the art.

German Offenlegungsschrift No. 2,303,861 is directed to a sprayable lubricant for glass container molds to be sprayed after every molding cycle. The sprayable lubricant describes the use of graphite in a finely divided solid organic polymer with a ratio of graphite to organic polymer being about 1:0.1 to 1:15. Offenlegungsschrift No. 2,303,861 has no recognition whatsoever, however, of forming a permanent or solid film lubricant on the mold as a glass-contacting or glass-forming, cavity-defining surface thereof since it is directed to spraying after every molding cycle.

From the foregoing, it will be appreciated that there is a need in the art of forming glass, employing hot metal mold technology, wherein in the forming steps there is no relative rotation of the glass and the mold, for providing a glass release agent or lubricant on the cavity-defining surface of the mold which does not present toxicity problems, and which results in high production efficiencies with the formation of high quality wear at low costs, and which further does not require emission into the adjacent environment of the significant amounts of pollutants presently emitted by swabbing with the dopants generally commercially employed.

In accordance with this invention, there is provided an improvement in methods for forming glass articles wherein the glass is formed by a hot metal mold operation in which the cavity-defining surface of a blank mold is provided with a layer of a glass-contacting, cavity-defining solid film lubricant or solid film glass release agent. This layer satisfies the needs in the art in that it has the needed operational characteristics so as to provide improved efficiencies in glass formation at higher quality and at lower costs and which greatly minimizes, if not eliminating, the environmental pollution in the forming areas which previously resulted from the necessity of swabbing.

Thus there is provided an improvement in processes for forming glass articles of the type wherein formable hot glass is formed into a blank, or parison, by contact with a glass-forming, cavity-defining surface of a hot metal blank, or parison mold, and the blank is then converted into the final glass article, such as, for example, a glass container, by contact with a glass-forming, cavity-defining surface of a blow mold; the improvement essentially resides in employing, as the glass-forming, or glass-contacting, cavity-defining surface of the hot metal blank mold, a layer or film of a solid lubricant, or glass release agent in which the layer is essentially non-colloidal graphite dispersed in a cured thermoset organopolysiloxane binder, with the graphite being present in an amount sufficient to provide a glass releasing quality to the layer. That is, instead of forming the parison, or blank, in a parison, or blank, mold by contact with the cavity-defining, metal surface of that mold, this cavity-defining surface is now provided with and carries a solid film lubricant layer. This layer is formed by applying a dispersion of the non-colloidal graphite in an organic solvent solution of a solvent-soluble, further-curable, thermosettable organopolysiloxane unto the cavity-defining metal surface of the mold to provide a cavity-defining layer whose expand surface will be used for contact with glass in the glass forming step. The non-colloidal graphite contemplated herein has a weight percent size distribution in which substantially all, for example, 95% by weight of the particles are in excess of 1 micron in contrast to colloidal graphite, in which substantially all of the particles, or at least a major amount such as, for example, 50–70% or so, of the particles by weight are less than 1 micron.

In another embodiment of this invention in addition to the blank mold having the solid layer indicated above, the blow mold is likewise provided with a solid film lubricant layer in the manner indicated above, with the size of the graphite in the layer on the blow mold being no larger than the size of the graphite employed for forming the blank mold layer and, preferably, in order to provide an extremely smooth surface on the glass article, the size of the graphite will be smaller than that employed in forming the layer on the blank mold.

As generally indicated above, the solid film glass lubricant layer is formed on the blank mold, or the blow mold, by applying onto the contour of the normal glass-contacting, cavity-defining metal surface of a conventional blank mold, or blow mold, a dispersion of the graphite in an organic solvent solution of a thermosettable, further-curable, organopolysiloxane. Conventional techniques will be advantageously employed in preparing the cavity-defining metal surface of the blow mold or blank mold to receive the dispersion. That is, in the preferred embodiment the mold surface will be prepared using conventional techniques of grit-blasting and priming. In the priming operation, conventional primers may be employed, such as, for example, the phosphates, with particularly suitable conventional primers being amino organosilicon compounds. Representative of satisfactory primers are those set forth, for example, in U.S. Pat. No. 3,088,847, as well as in British patent specification No. 952,992. Particularly, suitable primers are the amino organosilicon compounds exemplified in British Pat. No. 952,992, at Table I, such as, for example, the amino silicon material designated as D as well as combinations of these amino organosilicon compounds with the epoxy compounds therein indicated. The application of the graphite dispersion in the organic solvent solution of the further-curable, thermosettable, hardenable organopolysiloxane may likewise be done using conventional techniques, such as flow-coating and spray-coating. In passing, it should be mentioned that when reference is made herein to the graphite particle size, the size referred to is the size of the graphite added to the organopolysiloxane solution to form the dispersion. After applying the dispersion to the cavity-defining metal surface of the blow mold and after evaporation of the solvent, final curing of the organopolysiloxane is effected so as to form the solid film lubricant layer of graphite dispersed, or bound, in the thermoset, cured, hardened, organopolysiloxane binder and having a glass-contacting, cavity-defining surface. Generally, the thickness of the layer of the solid film lubricant once formed on the blank mold, which layer will have the general contour and configuration of the previous cavity-defining metal surface, will be balanced so as not to be so thick as to cause a flaking off of the film during utilization and glass formation, and yet not to be so thin that the film may result in premature failure due to film rupture. In general, it will be found that thicknesses of the final layer on the order of about 2 to about 3 and $\frac{1}{2}$ mils and, most desirably, a thickness in the range of about 2 to 3 mils, for example, about 2 and $\frac{1}{2}$ to 3 mils will provide excellent results for the blank mold or parison mold; with the blow mold the desired thickness will be about 1 to 2 mils, preferably about 1 to about 1.5 mils. For some of the general considerations involved in forming and applying solid lubricants reference may be had to *Solid Lubricants* by M. E. Campbell, J. B. Loser and E. Sneegas, NASA, Washington, D.C. May 1966, pages 7–17.

The organopolysiloxanes employed are the solvent-soluble, further-curable, hardenable, thermosettable organopolysiloxanes. These materials are well known in the art and are hydrolysis and condensation products of hydrolyzable silanes. That is, they are hydrolysis and condensation products of silanes having hydrolyzable groups thereon such as for example halide groups, typically the chloride group, or alkoxide groups, in which the alkyl portion of the alkoxide has from 1 to about 5 carbon atoms. The preferred thermosettable, solvent-soluble, further-curable organopolysiloxanes will be organopolysiloxanes in which the organo groups are lower alkyl groups, for example, $C_1$ to $C_3$ alkyl groups or phenyl groups. These materials may be prepared by hydrolysis and condensation of the respective hydrolyzable silane alone, or they can be hydrolysis condensation products of mixtures of the hydrolyzable silanes, or the organopolysiloxanes can simply be admixtures of 2 or more further-curable, thermosettable organopolysiloxanes. The preferred organopolysiloxanes are the thermosettable, hardenable, further-curable, methylphenylsiloxanes. As is well known in the art, these types of further-curable, thermosettable organopolysiloxanes can be described by reference to their R:Si ratio, wherein R designates the moles of organic radicals directly attached to the silicon atoms. As contemplated herein in the preferred practice of this invention, the organopolysiloxanes will have an R:Si ratio of 1:1, to less than about 2:1. At ratios higher than 2:1 the organopolysiloxanes are typically oils and are not the further-curable, thermosettable type of organopolysiloxane which will be advantageously employed herein. Highly desirable results will be obtained by using a further-curable, thermosettable organopolysiloxane having an R:Si ratio of about 1:1, or more, up to about 1.6:1 with especially fine results being obtained using an R:Si ratio between about 1.2:1 to about 1.6:1. As previously indicated in the preferred embodiment, the further-curable, thermosettable, organopolysiloxane is a methylphenylsiloxane. Thus, in the preferred practice, as will be readily apparent from the R:Si ratios given above, these siloxanes can be prepared by hydrolyzing the appropriate hydrolyzable silanes to obtain the desired R:Si ratio. For example, these materials can be obtained by the hydrolysis and condensation of a condensable and hydrolyzable monomer mixture of methyltrichlorosilane, phenyltrichlorosilane, and dimethyldichlorosilane. Alternatively, they can be prepared by the hydrolysis and condensation of methyltriethoxysilane, phenyltriethoxysilane and dimethyldiethoxysilane. Of course, as indicated above, other alkoxy silanes and other halosilanes may be employed as well as can mixtures thereof. Additionally, as indicated above, the R:Si ratio may be 1:1 which indicates that the organopolysiloxane can be a lower alkyl polysiloxanes, such as, for example, methylpolysiloxane manufactured from, for example, methyltrichlorosilane or methyltrialkoxysilanes, such as, for example, methyltriethoxysilane or the organopolysiloxane can be a phenyl organopolysiloxane such as that manufactured from, for example, a phenyltrichlorosilane or a phenyltrialkoxysilane, such as, for example, phenyltriethoxysilane or admixtures thereof.

The organic solvent for the further curable, thermosettable, hardenable, organopolysiloxane which is used to form the organic solvent solution thereof, and into which there is then dispersed the graphite as herein contemplated will be routinely selected by those skilled in the art. Exemplary solvents include ethyl alcohol, propyl alcohol, benzene, ethers, ketones, for example, acetone, mixtures thereof, mixtures for example of mineral spirits, isobutylacetate and ethylene glycol monomethyl ether, and aromatic solvents such as, for example, xylene and toluene. Particularly, fine results will be obtained, for example, when using xylene. The concentration of the further-curable, thermosettable organopolysiloxane in the organic solvent solution, will likewise be routinely selected by those skilled in the art but quite convenient operation will be obtained by employing, for example, an organic solvent solution of about 10 to about 35% by weight of organopolysiloxane solids, with quite convenient operation being obtained using a solution on the order of about 25 to 35% by weight of organopolysiloxanes. For example, an especially preferred system is around 30% by weight of organopolysiloxane in xylene.

Dry particulate, non-colloidal graphite is intimately combined with the solvent solution to form a dispersion of the graphite therein. Advantageously, the weight ratio of the graphite to the organopolysiloxane solids in forming the dispersion will be on the order of about 0.8:1 to about 2:1, preferably about 1:1 to about 2:1 with quite outstanding results being obtained by using a ratio of about 1:1 to about 1.75:1 and a ratio of 1.5:1 being superior. With regard to the size of the graphite, reference is made to the attached graph which is a conventional semi-log size plot for various graphites of the weight percent (ordinate axis) of particles which are coarser than a prescribed particle diameter (abscissa axis) in microns. For convenience the graph includes, as dotted lines, the 90% coarser and 10% coarser lines of the ordinate axis extending respectively from curves B to F. The curves are based on a Coulter Counter size analysis and when reference is made herein to size, there is meant a Coulter Counter size analysis. The graphite, which is surprisingly and most advantageously employed in forming the glass-contacting or glass-forming, cavity-defining surface of the solid film lubricant layer, or coating, on the blank mold will be graphite having a size distribution curve in which the curve between the 90% coarser and 10% coarser portion falls in the area approximately defined by: (1) curve B, (2) curve F, and (3) the 90% and (4) the 10% coarser lines of the ordinate axis and, preferably in the area approximately defined by: (1) curve C, (2) curve E, and (3) the 90% and (4) the 10% coarser lines of the ordinate axis. Quite outstanding results are obtained by using graphite having a size distribution curve within the area approximately defined by curve B and curve F and, preferably, within the area approximately defined by curve C and curve E, with graphite having a size distribution on the order of curve D being especially preferred. The foregoing generally describes the graphite to be employed on the blank mold solid film lubricant layer. In the embodiment wherein the blow mold is likewise provided with a layer of the solid film lubricant of graphite decreased in the thermoset, cured organopolysiloxane, the graphite employed in forming the blow mold layer will be of a size no larger than that employed in forming the layer on the blank mold and, preferably, will be smaller in size; if, for example, the graphite employed for the blow mold is of a size larger than about curve D it will be desirable to smooth out the surface of the solid film lubricant layer by rubbing with emery paper prior to use.

The dispersion of the graphite in the organic-solvent solution of the further-curable, thermosettable, organopolysiloxane which is applied onto the cavity-defining metal surface of the blank mold, or blow mold, may also include other materials. These other materials include, for example, materials which promote the curing rate of the organopolysiloxane in which case the cure promoters will be present in an amount sufficient to promote such curing. Typically, the cure promoters will be present in an amount less than about 15% by weight based on organopolysiloxane solids. The cure promoters which are employed will be routinely selected by those skilled in the art and are materials which are conventionally employed for curing further-curable organopolysiloxanes. Particularly suitable cure promoters which are per se known for curing organopolysiloxanes are the melamine formaldehyde, partial condensate resin, which term comprehends within its scope the alkylated melamine formaldehyde partial condensate resins. These alkylated melamine formaldehyde resins are melamine formaldehyde types in which alkylation is effected with lower alkyl alcohols, or mixtures thereof, such as, for example, the $C_1$ to $C_5$ alkyl alcohols. One suit suitable material is that supplied by the Koppers Chemical Company as their Koprez 70-10 butylated melamine formaldehyde partial condensate resin. When using, for example, the melamine formaldehyde partial condensation resins to promote the curing of the organopolysiloxane, quite satisfactory results will be obtained by using between about 0.5% or 1% by weight up to about 14 or 15% by weight, of the melamine formaldehyde partial condensate resin based on organopolysiloxane solids by weight. Excellent results will be obtained with no adverse effect on the wear rates or operation of the glass forming process by, for example, employing about 13 to 14% by weight of the melamine formaldehyde partial condensate resin, based on organopolysiloxane solids. Other particularly suitable cure promoters include the phosphonic acids such as those set forth in U.S. Pat. No. 3,654,058; with phenyl phosphonic acid being especially preferred, for example, in an amount of about 5% by weight based on organopolysiloxane. Additionally, the dispersion may include conventional adjuvants such as, for example, conventional thixotropes which are employed to adjust the rheology of the dispersion to give the flow best suited to the manner in which the dispersion is applied onto the cavity-defining metal surface of the mold. Typically, these thixotropes are present in rather small amounts, such as, for example, less than 2 or 3% by weight, based on organopolysiloxane solids. These thixotropes are well known in the art with one suitable material being Thixin R, supplied commercially by the Baker Castor Oil Company, which is a hydrogenated castor oil. Other suitable thixotropes which may be employed include, for example, those commercially available from Kelco Company under their Soloid designation.

After the dispersion of the graphite in the organopolysiloxane solution is applied onto the cavity-defining surface of a conventional blow mold, or blank mold, the solvent is allowed to evaporate and then the organopolysiloxane is heated for a sufficient time and at a sufficient temperature to convert it to a hard, cured, thermoset organopolysiloxane. This results in the formation of the layer, or coating, which has a glass-contacting, or glass-forming, cavity-defining surface which functions as the solid film lubricant herein and which layer includes the graphite dispersed in the cured organopolysiloxane binder. Of course, as will be appreciated, if a cure promoter is employed and/or a thixotrope the binder will likewise include these materials. Generally, as will be seen herein, the binder will be on the order of at least about 80% by weight, and typically at least about 85% by weight of the thermoset, cured, organopolysiloxane.

While the present invention has been described with sufficient particularity above to enable those skilled in the art to routinely make and use the present invention there nonetheless follows several examples which will further exemplify the invention with regard to blank molds.

For purposes of convenience in the following examples when reference is made to R-630 resin this refers to a hardenable thermosettable organopolysiloxane resin solution (60% by weight resin solids in xylene) in which the organic groups are methyl and phenyl groups, i.e., a methylphenylsiloxane, and wherein the ratio of these organic groups i.e. the ratio of methyl and phenyl radicals per silicon atom (R:Si ratio) is about 1.4 and wherein the ratio of methyl to phenyl radicals on a mole basis is about 3.3:1, both of these values being based on analysis. Additionally, for purposes of convenience various graphites are referred to in the examples. The graphite designated 007-S corresponds to the size analysis generally exemplified by curve C, the graphite designated A-98 generally corresponds to the size analysis designated by curve D and the graphite designated UC-38 corresponds to the size analysis designated by curve E. These curves represent the averages of at least two separate Coulter Counter size analysis for each graphite.

The specific Coulter Counter employed was a Model T type manufactured and supplied by Coulter Electronics Inc.; the technique employed was the conventional technique employing multiple apertures of 400, 140, 50, and 30 microns and employed an electrolyte of about 4 grams of lithium chloride in 100 ml of a solution of the lithium chloride in methanol. The 007-S and A-98 graphite was commercially obtained from Asbury Graphite Mills Inc., and the No. 38 material was obtained from Union Carbide Chemical Company. In general, these graphites may be described as electric furnaces, or synthetic, graphite and are supplied as dry particulate material. Suitably, for convenience in the following examples reference is made to a cure promoter, or catalyst, designated Koprez 70-10. This resin is commercially available from Koppers Chemical Company and is an organic solvent solution of a butylated melamine formaldehyde partial condensate resin, the resin solids being about 80% by weight in n-butyl alcohol.

In the following examples, the blank molds were prepared by employing a vertically reciprocating spray. That is, the split molds were closed and the cavity-defining surface thereof was sprayed by employing a vertically reciprocating 360° spray nozzle. Specifically, a carriage was provided which was pneumatically moved in a vertical direction and this carriage carried a vertically disposed tubular member to which was attached, at its lower portion, a 360° spray nozzle; the cavity portions of the mold were sprayed by supplying the anhydrous dispersions, as described in the examples, to the spray nozzle through the tubular member with spraying transpiring while the carriage was pneumatically moved upwardly. Prior to spraying, the cavity-defining surfaces of the mold they were first conventionally grit-blasted and then primed with conventional primers. The specific material employed is that commercially supplied by Union Carbide Corporation, as their material A.P. 132. The molds, after curing the organopolysiloxane so as to provide a layer on the mold, of graphite dispersed in a cured organopolysiloxane binder, having a glass-forming, or glass-contacting, cavity-defining surface, were employed as the blank molds in a pilot plant facility having conventional I.S.

machines to form what is referred to in the trade as GB-121 glass bottles. The I.S. machines used the prepared hot metal molds and were operated in a blow and blow mode of operation, although it will be apparent that a press and blow mode of operation is equally satisfactory. That is, in the forming operation a formable hot glass charge was formed into a parison, or blank, in a parison or blank mold with no relative rotation thereof and then the parison, or blank, was formed into the final bottle in a blow mold, again with no relative rotation of the glass and blow mold. In the examples which follow the neck rings and bottom plates were not provided with the solid film lubricant layer contemplated herein although it will be apparent they can be.

Finally, in the examples which follow, wear rates are given, as well as are mold lifetimes. Wear rate is the parameter used to evaluate the quality of the blank mold solid film lubricant layer. The wear rate is expressed as a loss of coating thickness per unit time and is reported in mils/hour. Thus, the larger the number the greater the amount of wear. The blank molds are coated and the thickness of the coating, or solid film lubricant layer, is measured at six points, three on each side of the split cavity mold. The points used are one inch from the top of the cavity, one inch from the bottom, and the approximate middle of the mold blank. The same points will be used when thickness measurements are made again after wearing has occurred by use in the hot metal mold, glass-forming process. The coating thickness is measured by using a magnetic thickness gauge type 7000 manufactured by H. Tinsley and Company Ltd., London, England. The molds are then mounted in the glass forming machine, here an I.S. bottle forming machine, and bottles are made until they are no longer of the desired quality, i.e. until the mold coating fails. The failure of the mold coating is that point at which any bare metal of the mold becomes exposed. This exposure typically causes sticking of the glass to the exposed metal surface of the mold creating a defect in the glass surface. The blank mold is then removed from the machine and coating thickness measurements are made at the same six points. The decrease in coating thickness at each location divided by the time the mold was in use is the wear rate at that location. The average of the six wear rates at different sites on the blank mold is the wear rate of the coating material or solid film lubricant layer for that particular mold. The overall wear rate for the particular solid film lubricant layer, which is reported, is calculated by taking the average of the wear rates of each individual mold that was coated with that material and run in the glass forming machine. The number of blank molds used with a given coating material was always in excess of two and most typically four.

The lifetime of a mold with the solid film lubricant layer is, of course, dependent on the wear rate and also on the thickness of the layer. A highly significant, additional factor, regarding lifetime, is the degree of uniformity of loading of the formable glass into the mold. That is, in order to obtain lifetimes which would be projected from the wear rates it is extremely important that the formable glass be uniformly loaded into the mold so as to preclude any localization of wear in one area. Such localization, of course, gives a misleading lifetime which does not fairly represent the characteristics of the solid film lubricant layer since only a small spot or area may indicate the lifetime has been exceeded but if uniform loading had been obtained a significantly higher lifetime would be realized. The lifetimes reported in the examples are the ranges for the respective molds where glass quality became undesirable.

EXAMPLE 1

(A) A dispersion was prepared by intimately combining about 150 grams of xylene, 150 grams of the R-630 resin solution, 135 grams of No. 38 graphite and 15 grams of the butylated melamine formaldehyde resin solution (Koprez 70-10). The dispersion of the graphite in the organic solvent solution of the further-curable organopolysiloxane and the added butylated melamine formaldehyde partial condensate resin was then intimately admixed and sprayed onto the cavity-defining metal surface of the blank molds. Following solvent evaporation the system was cured for one hour at about 650° F. so as to effect the final curing of the further-curable organopolysiloxane resin and provide each mold with a layer of a solid film lubricant, in which the graphite was dispersed in the cured binder. This solid layer instead of the previous metal surface, becomes the glass-forming, cavity-defining surface of the blank mold. The molds were then employed as the blank molds on an I.S. machine and showed an average wear rate of about 0.114 and a lifetime of 11 to about 25.5 hours.

(B) The procedure of Example I-A was substantially duplicated except the butylated melamine formaldehyde resin was omitted and the curing was done using a cycle of about one hour at about 200° F., then 1 hour at 500° F., and 2 hours at about 600° F. The blank molds when evaluated on the I. S. machine, showed a wear rate of about 0.121 and a lifetime of about 22 to about 33.5 hours.

(C) The procedure of A above was repeated except that the R-630 resin was a new lot and had a lower viscosity. When this was run a wear rate of about 0.085 was obtained and the lifetime was about 26 to about 29 hours.

EXAMPLE II (D) The procedure of Example I-B was substantially duplicated except instead of employing the No. 38 graphite, there was employed A-98 graphite with the weight ratio of graphite to organopolysiloxane solids being substantially the same, that is, a weight ratio of about 1.5:1 and about 0.8 grams of THIXIN R, a well known thixotrope, manufactured by Baker Castor Oil Company was also used. The molds showed an average wear rate of about 0.083 and a lifetime in the pilot plant of about 24 to about 27.5 hours.

(E) The procedure of Example I-A was substantially duplicated except for the No. 38 graphite there was employed the A-98 graphite in the weight ratio of about 1.5:1 graphite to organopolysiloxane and the dispersion included 0.8 grams of Thixin R. The wear rate for these molds was about 0.072 and showed a life in the pilot plant of 12 to 32 hours.

(F) The procedure of Example II-E was repeated on a different occasion and the molds showed a wear rate of 0.068 and a pilot plant lifetime of 22 to 27 hours.

(G) The procedure of Example II-F above was generally repeated except the amount of the butylated melamine formaldehyde material was cut by a factor of 10; that is, Example II-F was followed, employing A-98 graphite as therein indicated, but the amount of the butylated melamine formaldehyde resin solution, instead of being 15 grams, was cut to about 1.5 grams.

These molds exhibited an average wear rate of 0.106 and a pilot plant lifetime of 13 to about 26.5 hours.

EXAMPLE III (H) The procedure of Example II-E was followed using the same weight ratio of graphite to organopolysiloxane solids, except instead of employing the A-98 graphite there was employed 007-S graphite. These molds showed an average wear rate of 0.1005 and a pilot plant lifetime of about 14.5 to about 19.75 hours.

EXAMPLE IV

The procedure of Example II-E which showed an average wear rate of 0.072 was repeated except that instead of employing a weight ratio of graphite to organopolysiloxanes of 1.5:1, as therein employed, the weight ratio was varied. Runs in which the weight ratio was about 1:1 showed a wear rate of 0.116 and a pilot plant lifetime of 15 to 22.5 hours. Runs wherein the weight ratio of graphite to organopolysiloxane solids was about 1.75:1, showed a wear rate of about 0.105 and the lifetime was about 25.25 to about 30.5 hours. This indicates the unexpected superiority of employing a weight ratio of graphite to organopolysiloxane solids of about 1.5:1.

EXAMPLE V (I) A hardenable, thermosettable, further-curable organopolysiloxane wherein the organic groups where methyl and phenyl groups and wherein the ratio of methyl to phenyl groups was about 3.6:1 and wherein the mole ratio of the organic radicals, that is, the phenyl and methyl radicals to silicon atoms (R:Si ratio) was about 1.4, was prepared employing a charge of about 2.98 moles of dimethyldiethoxysilane, about 2.31 moles of methyltriethoxysilane and about 2.27 moles of phenyltriethoxysilane. To this charge was added about 19.7 moles of water and then about 20 parts per million of HCl based on the total silane charge. This mixture was heated to reflux and held for about 4 hours. Prior to reaching reflux the two phase system clears to a single phase. After this the solution was concentrated by removing some ethanol byproduct and water by distillation and then further heated to precure the resin without gelling. The procedure is that generally set forth in U.S. Pat. No. 3,389,121. Xylene was then added to form a solution which was about 80% organopolysiloxane resin solids. With the addition of this xylene, and then by employing a Dean-Starke trap, the system was refluxed for about 4 hours with water being taken off through the Dean-Starke trap during this entire period. The thermosettable, further-curable organopolysiloxane solution was then cooled to room temperature and was then diluted with additional xylene to provide a solution of about 60% by weight of organopolysiloxane solids. The procedure of Example II-E was then generally followed using the same charge except that this organopolysiloxane resin solution was used instead of the R-630 resin solution, and only about 90 grams of additional xylene was added; that is, 150 grams of this resin solution (which contains about 60% further-curable organopolysiloxane solids and about 40% xylene) was employed instead of the 150 grams of R-630 and instead of 150 grams of the additional xylene about 90 grams were employed. The material was sprayed onto the molds and cured. The blank molds showed a wear rate of about 0.092. The viscosity of the dispersion which was sprayed was on the order of about 550 to 600 cps. The same spray solution was then diluted with additional xylene to a viscosity on the order of about 250 to 270 cps. The molds were then heated to cure the organopolysiloxane. These molds showed a wear rate of about 0.070. The lifetimes obtained were about 16 to about 31 hours and about 19 to about 31.7 hours, respectively.

(J) The procedure of II-E was repeated except that the 60% organopolysiloxane solution produced in Example V-I was used instead of the R-630 solution and the amount of the butylated melamine formaldehyde resin solution was cut from 15 grams to about 1.5 grams. The blank molds with the cured layer of the glass-forming, cavity-defining solid film lubricant showed a wear rate of about 0.077 and a pilot plant lifetime of about 12.5 to about 23.75 hours.

(K) On another occasion a 60% organopolysiloxane solution, which had been prepared in the manner as that described in V-I, was employed using the formulation of Example II-E (but substituting this solution for the R-630 solution). A wear rate of about 0.059 was obtained with a lifetime in the pilot plant of about 19 to about 46 hours.

EXAMPLE VI

In order to investigate the operability of colloidal graphite an experiment was run employing colloidal graphite [No. 154 colloidal graphite supplied by Acheson Colloid Company as a dispersion of colloidal graphite (20%) in isopropyl alcohol (80 weight percent)], a Coulter Counter size distribution for which is set forth in the attached graph as curve A. The spray dispersion was prepared by intimately combining about 150 grams of the R-630 solution, 675 grams of the No. 154 colloidal graphite (weight ratio of graphite solids to organopolysiloxane solids of about 1.5:1) and 15 grams of the Koprez 70-10 solution and had a viscosity of about 560 cps at 25° C. Several spray passes were employed and thickness of the final layer of the graphite bound in the cured organopolysiloxane was about 2.6 to 2.7 mils. Curing was effected at about 650° F. for about 1 hour. The use of these blank molds employing the colloidal graphite showed an average wear rate of 0.210 and a lifetime of about 8 to about 12 hours. It will be noted that the wear rate is significantly higher than the wear rates obtained in forming glass articles in the blank molds by employing the systems contemplated herein. Thus, it will be appreciated that severe economic penalties are incurred with regard to the frequency of mold changes if one were to employ a colloidal graphite system.

EXAMPLE VII

The general procedure of Example II-E was repeated but instead of employing the A-98 graphite therein the dispersion was prepared by admixing 20% by weight of the 007-S graphite employed in Example III and about 80% by weight of the A-98 graphite employed in Example II-D. The molds for this run exhibited a wear rate of about 0.102 and a lifetime of about 17.5 to about 26 hours.

EXAMPLE VIII (L) In a manner similar to the above a commercially available further-curable, thermosettable, organopolysiloxane was obtained from Dow Corning Company. The specific material employed was what is designated as Dow 805. This material is a 50% solution, by weight, of a further-curable, thermosettable organopolysiloxane in toluene. About 360 grams of this solution, about 270 grams of the A-98 graphite, about 220 grams of xylene, about 36 grams of the Koprez 70-10 butylated melamine formaldehyde solution, and about 1.6 grams of the Thixin R, were intimately combined and admixed to form a sprayable dispersion. This dispersion was then applied onto the cavity-defining surface of the blank molds and cured for about one hour at about 650° C. to provide the blank molds with a glass-forming, cavity-defining layer of the graphite bound in a thermoset cured organopolysiloxane. When evaluated, a wear rate of about 0.088 was obtained and a lifetime on the order of about 24 to about 31 hours was obtained.

(M) In a manner similar to that of Example VIII-L a further-curable, thermosettable organopolysiloxane was employed which is available from the General Electric Company under their designation SR-240. This material is likewise supplied as a 50% by weight solution of a further-curable, thermosettable, organopolysiloxane in toluene. The materials were combined in the same proportions as that indicated in the Example VIII-L with the exception, of course, being that the SR-240 solution was employed instead of the Dow 805. The resulting dispersion had a viscosity of about 1260 c.p.s. at about 25° C. The molds with the solid film lubricant, or layer, produced from this system showed a wear rate of about 0.122 and a lifetime on the order of about 16.75 to about 22 hours.

(N) A solvent-soluble further-curable, thermosettable, precured organopolysiloxane was produced following the teachings of U.S. Pat. No. 3,389,121 employing a condensation monomer mixture of methyltriethoxysilane and phenyltriethoxysilane with the ratio of phenyltriethoxysilane to the methyltriethoxysilane being about 4:1. Thus, this material would have an R:Si ratio of about 1:1 and the ratio of methyl moieties to phenyl moieties on the order of about 0.25:1. This resin was then dissolved in xylene employing 90 grams of the further-curable, organopolysiloxane and 60 grams of xylene to produce a solution. This solution was then used in the manner indicated in the Example II-E to provide a solid film lubricant layer on the molds. The molds exhibited an average wear rate of about 0.102 and a lifetime of about 15 to about 18.75 hours.

(O) In a similar manner, a resin was prepared following the teachings of U.S. Pat. No. 3,389,121, to produce a thermosettable, hardenable, further-curable precured organopolysiloxane by employing a monomer condensation mixture of about 4 moles of phenyltriethoxysilane, 1 mole of methyltriethoxysilane, and about 0.5 moles of dimethyldiethoxysilane. This composition would have an R:Si ratio of about 1.09:1 and a ratio of methyl moieties to phenyl moieties on the order of about 0.5:1. This material was made up into a solution by dissolving about 90 grams of the further-curable, organopolysiloxane and 60 grams of xylene. This solution was then used in lieu of the R-630 solution of Example II-E to form a layer of the graphite bound or dispersed in the cured thermoset organopolysiloxane. The molds with this layer on it exhibited a wear rate of about 0.083 and a lifetime of about 16.5 to about 19.5 hours.

(P) Following the teachings of U.S. Pat. No. 3,389,114 a further-curable, thermosettable, precured organopolysiloxane was prepared employing only methyltriethoxysilane as the condensable monomer. About 90 grams of this thermosettable, further-curable, solvent-soluble organopolysiloxane was intimately combined with about 210 grams of xylene and about 32 grams of isopropyl alcohol along with about 135 grams of A-98 graphite, about 15 grams of the Koprez 70-10 butylated melamine formaldehyde solution and about 0.8 grams of the Thixin R material. The organopolysiloxane prepared in this manner has an R:Si ratio of about 1:1. This dispersion had a viscosity of about 140 cps and was applied unto the cavity-defining service of the blank molds to obtain a layer of the solid film lubricant. The curing was done at about 1 hour for about 650° F. The average wear rate for these blank molds was on the order of about 0.085 and a lifetime on the order of about 9 to about 18.5 hours, was obtained.

EXAMPLE IX

The procedure, as generally indicated above with regard to Example II-E, was followed with regard to the preparation and formation of a blank mold having a glass-forming, cavity-defining solid film lubricant layer thereon. Additionally, a blow mold is prepared in substantially the same manner with the exception that instead of employing the A-98 graphite, the dispersion which is applied employs a graphite manufactured and supplied from the Joe Dixon Company under their designation 200-42 which graphite has a Coulter Counter size distribution of about that represented by curve B. Thus, the only modification on the blow mold is to use a graphite which was no larger than the size employed for the blank mold and, preferably, is smaller. When the IS machine is run excellent results are obtained in terms of wear rate on the blank mold as well as producing a high quality, smooth surface on the resulting glass article in the blow mold.

The above generally shows the unexpected superiority of the present invention over the use of colloidal graphite wherein it is seen that substantially and significantly lower wear rates on the blank molds, e.g. about 0.125 and less, are obtained with the present invention.

With regard to the foregoing it may generally be stated that the thickness of the ultimate solid film lubricant layer, which as will be apparent, represents graphite bound in a thermoset, hardened organopolysiloxane binder and which, likewise as indicated above, may further include a cure promoter such as the butylated melamine formaldehyde resin indicated and optionally suitable adjuvants such as, for example, a thixotrope, was in the range of about 2.2 to about 2.8 mils. Additionally, in spraying the dispersions in order to obtain the material on the mold which is then subsequently cured, it will be found that best results are obtained if the spraying is done under certain conditions; that is, the spray of the dispersion when applied onto the cavity-defining surface of the mold will be adjusted in such fashion so that solvent evaporation, prior to the dispersion coming into contact with the mold surface is not so severe that only solids impinge on the mold surface being sprayed and yet, the spray will not be so wet that the dispersion, as it impinges upon the mold surface, will run because of too much solvent being present.

In the foregoing specification and examples, and the claims which follow, when reference is made to the size of the graphite it will, of course, be understood that reference is made to the dry, particulate graphite which is initially employed, that is, the graphite, which is added to form the dispersion which is then applied onto the cavity-defining surface of the mold. Additionally when reference is made in the claims to various curves and to 90% and 10% coarser lines it is to be understood that the attached graph is, in effect, incorporated into the claims.

I claim:

1. In a process of forming a glass article wherein formable hot glass is formed into a blank by contact with a glass-forming, cavity-defining surface of a hot metal blank mold and said blank is then converted into said article by contact with a glass-forming, cavity-defining surface of a blow mold, and wherein said blank formation and said article formation is done without relative rotation of the glass and said molds, and wherein one of said glass-forming, cavity-defining surfaces is a solid layer comprising a solid lubricant dispersed in an organopolysiloxane binder, the improvement wherein said glass-forming, cavity-defining surface of said blank mold carries said solid layer and wherein said layer consists essentially of non-colloidal graphite, present in an amount sufficient to provide a glass releasing quality to said layer, an organopolysiloxane and up to 15% by weight, based on the organopolysiloxane, of a siloxane cure promoter.

2. The improvement of claim 1 wherein said graphite employed in said solid layer has a size distribution curve in which said curve between about the 90% and about the 10% coarser portion falls in the area of that approximately defined by curves B and F and the 90% and 10% coarser lines of the ordinate axis in the attached graph and wherein said binder consists essentially of the product obtained by curing said organopolysiloxane in the presence of an effective cure promoting amount of a siloxane cure promoter.

3. The improvement of claim 1 wherein said glass-forming, cavity-defining surface of said blow mold also carries said solid layer and wherein the size distribution of the graphite in this latter layer is smaller than the size distribution of the graphite used in said blank mold layer.

4. The improvement of claim 2 wherein said graphite has a size distribution within the area approximately defined by curve C and curve E.

5. The improvement of claim 1 wherein said graphite has a particle size distribution within the area approximately defined by curve B and curve F, said solid layer having a wear rate of less than about 0.125.

6. The improvement of claim 2 wherein said area is approximately defined by curves C and E and said 90% and 10% coarser lines.

7. The improvement of claim 2 wherein the said weight ratio of said graphite to said organopolysiloxane is between about 0.8:1 to about 2:1.

8. The improvement of claim 7 wherein said ratio is about 1:1 to about 1.75:1.

9. In a method for producing a glass-forming, cavity-defining surface on a hot metal glass-forming mold wherein a further-curable, thermosettable, hardenable organopolysiloxane is applied unto a cavity-defining surface of a glass-forming mold and said organopolysiloxane is cured to a thermoset, hardened, glass-forming layer thereon, the improvement wherein said organopolysiloxane is applied in a system consisting essentially of said organopolysiloxane, an organic solvent, a lubricating graphite having a size distribution curve in which said curve between about the 90% and about the 10% coarser portion falls in the area approximately defined by curves B and F and the 90% and 10% coarser lines of the ordinate axis of the attached graph, a cure promoter for said organopolysiloxane in an amount sufficient to enhance the rate of curing of said organopolysiloxane and wherein the weight ratio of said graphite to organopolysiloxane is in the range of about 0.8:1 to about 2:1.

10. The improvement of claim 9 wherein said cure promoter is a melamine formaldehyde partial condensate resin.

11. The improvement of claim 10 wherein said resin is an alkylated melamine formaldehyde resin and wherein the ratio of graphite to organopolysiloxane is about 1:1 to about 1.75:1.

12. A glass forming mold produced in accordance with the process of claim 9.

13. A process for producing a glass article which comprises forming formable hot glass into a blank by contact with a glass-forming, cavity-defining surface of hot metal mold without relative rotation of said glass and said surface, said mold being produced in accordance with the process of claim 9, and thereafter forming said blank into said article in a blow mold without relative rotation of said blow mold and said blank.

14. A process for producing a glass article comprising: (a) forming formable glass into a parison in a blank mold without relative rotation of said glass and said mold, said blank mold having a cavity-defining glass-releasing and glass-contacting layer of graphite dispersed in a thermoset organopolysiloxane binder thereon, said layer having a thickness of about 2 to about 3 mils, and formed by 1. applying unto the cavity-defining surface of a blank mold a composition consisting essentially of graphite dispersed in an organic solvent solution of a solvent-soluble, thermosettable, further-curable organopolysiloxane and less than about 15% by weight, based on the organopolysiloxane, of a siloxane cure promoter, said graphite having a particle size distribution in the area approximately defined by curve B and curve E and the weight ratio of said graphite to said organopolysiloxane being between about 1:1 to about 1.75:1, said organopolysiloxane having an R:Si ratio of 1:1, or more, up to less than 2:1, wherein R represents the organic moieties bonded to silicon atoms, and 2. heating said organopolysiloxane to a thermoset condition so as to provide said mold with said layer, and (b) forming said parison into a glass article in a blow mold without relative rotation of said parison and said blow mold.

15. The process of claim 14 wherein said organopolysiloxane is a methylphenylsiloxane having an R:Si ratio of about 1.6:1, or less.

* * * * *